US008005408B2

(12) United States Patent
Nakamura et al.

(10) Patent No.: US 8,005,408 B2
(45) Date of Patent: Aug. 23, 2011

(54) DEVELOPING BLADE AND ITS MANUFACTURING METHOD

(75) Inventors: Hiroshi Nakamura, Takayama (JP); Hitoshi Yamauchi, Shinagawa-ku (JP); Koji Abe, Shinagawa-ku (JP); Katsuhiko Sekine, Shinagawa-ku (JP); Junji Tsuboi, Shinagawa-ku (JP); Shinji Souma, Shinagawa-ku (JP)

(73) Assignee: Fujikura Rubber Ltd., Tokyo (JP)

( * ) Notice: Subject to any disclaimer, the term of this patent is extended or adjusted under 35 U.S.C. 154(b) by 420 days.

(21) Appl. No.: 12/278,850

(22) PCT Filed: Mar. 28, 2007

(86) PCT No.: PCT/JP2007/057507

§ 371 (c)(1), (2), (4) Date: Aug. 8, 2008

(87) PCT Pub. No.: WO2007/114453

PCT Pub. Date: Oct. 11, 2007

(65) Prior Publication Data

US 2010/0166467 A1 Jul. 1, 2010

(30) Foreign Application Priority Data

Mar. 31, 2006 (JP) ................................ 2006-097799

(51) Int. Cl.

| | |
|---|---|
| ***G03G 15/08*** | (2006.01) |
| ***G03G 15/095*** | (2006.01) |
| ***G03G 15/10*** | (2006.01) |
| ***B29C 45/14*** | (2006.01) |

(52) U.S. Cl. ......... 399/284; 399/249; 399/264; 264/279

(58) Field of Classification Search .................. 399/249, 399/264, 284; 264/279

See application file for complete search history.

(56) References Cited

U.S. PATENT DOCUMENTS

| | | | | |
|---|---|---|---|---|
| 5,278,616 | A * | 1/1994 | Hirano et al. ................. | 399/279 |
| 2004/0120734 | A1* | 6/2004 | Okamoto ...................... | 399/284 |
| 2008/0145662 | A1 | 6/2008 | Nakamura et al. | |

FOREIGN PATENT DOCUMENTS

| | | |
|---|---|---|
| JP | 6 202459 | 7/1994 |
| JP | 11 288166 | 10/1999 |
| JP | 2005 274646 | 10/2005 |

OTHER PUBLICATIONS

U.S. Appl. No. 12/281,150, filed Aug. 29, 2008, Souma, et al.

* cited by examiner

*Primary Examiner* — David M Gray
*Assistant Examiner* — Joseph S Wong
(74) *Attorney, Agent, or Firm* — Oblon, Spivak, McClelland, Maier & Neustadt, L.L.P.

(57) ABSTRACT

A developing blade (1) comprises a support member (2) having a coefficient of elasticity in the range of $0.5\times10^4$ to $4.0\times10^4$ kg/mm$^2$ and a moment of inertia of area (Iz) in the range of 6.5E-04 to 1.2E-02, and a blade member (4) located on one surface of the support member (2) along one side edge (2A). The blade member (4) is made of a rubber material having a 25% modulus of no greater than 0.85 MPa, and has a moment of inertia of area (Iz) in the range of 8E-02 to 1.2E+01, and the blade member (4) has a warping of no greater than 10 mm in the longitudinal direction.

10 Claims, 7 Drawing Sheets

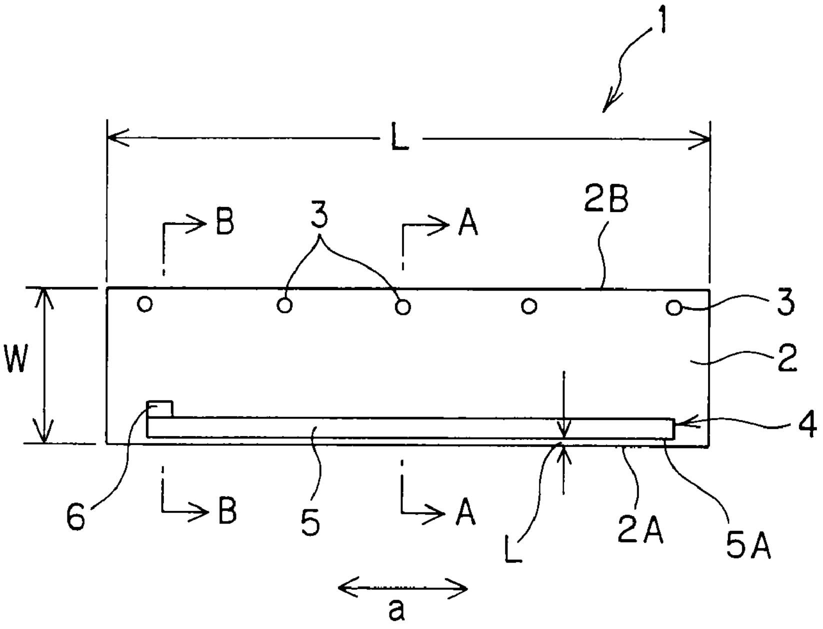
FIG. 1
FIG. 2A
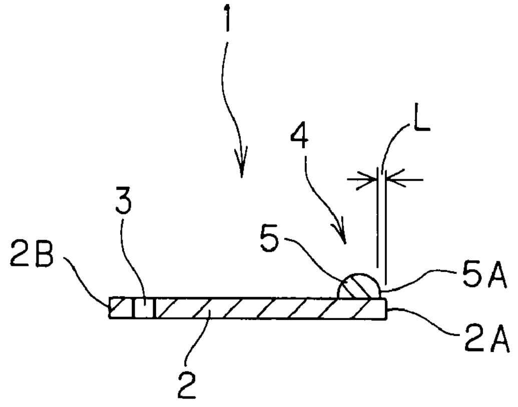
FIG. 2B
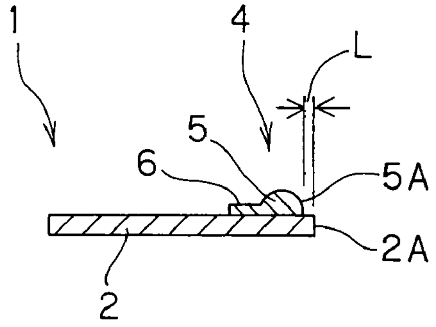

DEVELOPING BLADE AND ITS MANUFACTURING METHOD

TECHNICAL ART

The present invention relates generally to a developing blade and its manufacturing method, and more specifically to a developing blade used with developer equipment for electrophotographic imagers such as laser printers, copiers and facsimiles, and its manufacturing method.

BACKGROUND ART

An imager making use of an electrophotographic imaging process comprises developer equipment for developing latent images on a photosensitive drum. For this developer, as shown typically in FIG. 12, there is a developer 61 known so far in the art, which is of the structure that comprises a hopper 62, a developing roller 63, a rotatable agitator 64 and a developing blade 65 (JP(A)2003-43812). With this developer 61, a toner 66 in the hopper 62 is fed by the agitator 64 to the developing roller 63 so that the toner in thin layer form is uniformly carried on the peripheral surface of the developing roller 63 by frictional electrification between the developing blade 65 and the developing roller 63. And then, the toner 66 passes from the developing roller 63 onto the photosensitive drum 67 with a latent image formed on it for development.

As shown typically in FIG. 13, the developing blade 65 known so far in the art is of the structure that comprises a rubber blade member 74 along the side edge 72A of a metallic support member 72 having a thickness of about 0.1 mm.

A problem with the conventional developing blade is, however, that the support member 72 is deformed and warped toward the blade member 74 depending on differences in thermal shrinkage between them, because the blade member 74 is formed on one surface of the support member 72. The developing blade undergoing such warpage is poor in handling capabilities, and poor in mounting capabilities as well, because the deformed product must be flattened for mounting.

And now, the aforesaid warping of the developing blade may be held back by increasing the thickness or width of the support member 72 or diminishing the width of the blade member 74. However, as the thickness or width of the support member 72 grows large, it causes the spring action of the support member 72 to become worse, often doing some detriment to the appearance of the function of the developing blade in the developer or working to the detriment of size reductions of the developer, resulting in added manufacturing costs. A problem with diminishing the width of the blade member 74 is that it is difficult to form the blade member 74 by means of molding or it is detrimental to the appearance of the function of the developing blade in the developer.

DISCLOSURE OF THE INVENTION

An object of the invention is to provide a developing blade that, albeit having sufficient spring action, is substantially free from warping, and a method for manufacturing such a developing blade.

According to the invention, such an object is accomplishable by the provision of a developing blade, comprising a support member and a blade member located on one surface of said support member along one side edge of said support member, wherein said support member has a coefficient of elasticity in the range of $0.5\times10^4$ to $4.0\times10^4$ kg/mm$^2$ and a moment of inertia of area (Iz) in the range of 6.5E-04 to 1.2E-02, said blade member is made of a rubber material having a 25% modulus of no greater than 0.85 MPa and has a moment of inertia of area (Iz) in the range of 8E-02 to 1.2E+01, and said blade member has a warping of no greater than 10 mm in the longitudinal direction.

In an embodiment of the invention, said support member is made of stainless steel and has a thickness of 0.07 to 0.2 mm and a width of 12 to 30 mm.

In an embodiment of the invention, said support member is made of phosphor bronze and has a thickness of 0.2 to 0.4 mm and a width of 12 to 30 mm.

In an embodiment of the invention, said side edge of said support member extends 0.02 to 2 mm out of the top end of said blade member.

In an embodiment of the invention, said support member has at a peripheral edge a minute projection jutting toward a surface having said blade member.

Albeit using the very thin support member having a coefficient of elasticity in the range of $0.5\times10^4$ to $4.0\times10^4$ kg/mm$^2$ and a moment of inertia of area (Iz) in the range of 6.5E-04 to 1.2E-02, such a developing blade of the invention as described above can have a warping of no greater than 10 mm in the longitudinal direction by using the blade member having a 25% modulus and a moment of inertia of area (Iz) within the predetermined ranges. This makes the developing blade excellent in flatness and allows the support member to produce good spring action. Thus, the ability of the developing blade to be mounted on a developer is improved without detrimental to the function of the developer and size reductions of the developer.

The invention also provides a method for manufacturing a developing blade comprising a blade member along one side edge of a support member by using as the support member a material having a coefficient of elasticity in the range of $0.5\times10^4$ to $4.0\times10^4$ kg/mm$^2$ and a moment of inertia of area (Iz) in the range of 6.5E-04 to 1.2E-02, using as the blade member a rubber material having a 25% modulus of no greater than 0.85 MPa and having a moment of inertia of area (Iz) in the range of 8E-02 to 1.2E+01, and using as a mold assembly a top mold comprising a mold surface with a cavity formed in it for the formation of the blade member and a gate in communication with said cavity, and a bottom mold having a flat mold surface, wherein while said cavity is closed up with said support member and the neighborhood of said side edge of said support member is held between the edge of said cavity in the top mold and the bottom mold, the top and bottom molds are brought in alignment and clamped together, so that a molding material is poured from said gate into said cavity.

In an embodiment of the invention, a portion 0.02 to 2 mm away from said side edge of said support member is held between the edge of said cavity in the top mold and the bottom mold.

In an embodiment of the invention, said support member has a minute projection at a side edge of one surface, and said support member is held while the surface having said minute projection faces the mold surface of said top mold.

With such an inventive manufacturing method as described above, it is possible to manufacture a developing blade that, albeit having sufficient spring action, is substantially free of warping. Further, the top and bottom molds are clamped together while the neighborhood of the side edge of the support member is held between the edge of the cavity in the top mold and the bottom mold, so that the top mold is in firm engagement with the neighborhood of the side edge of the support member, whereby entrance of the molding material between the top and the support member is staved off, and a developing blade with none of fins at the end (the side edge of the support member) can be manufactured.

BRIEF DESCRIPTION OF THE DRAWINGS

FIG. 1 is a plan view illustrative of one embodiment of the developing blade according to the invention.

FIG. 2 is illustrative of the developing blade shown in FIG. 1; FIG. 2A is an enlarged sectional view as taken on line A-A, and FIG. 2B is an enlarged sectional view as taken on line B-B.

FIG. 9 is illustrative in section of a further embodiment of the developing blade according to the invention.

BEST MODE FOR CARRYING OUT THE INVENTION

Figure 3:
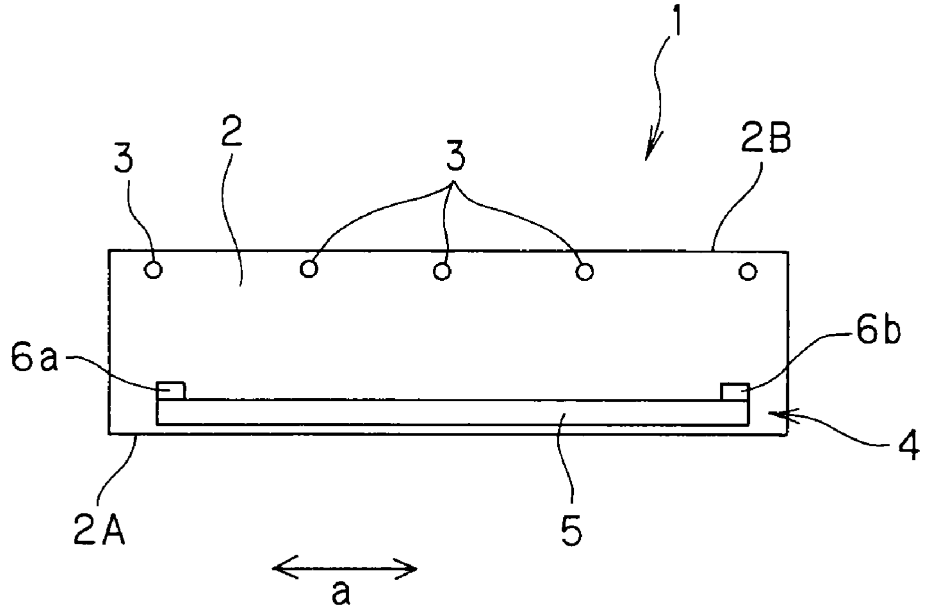
FIG. 3 is a plan view illustrative of another embodiment of the developing blade according to the invention.

Embodiments of the invention are now explained with reference to the drawings.

FIG. 1 is a plan view of one embodiment of the developing blade according to the invention, and FIG. 2 is illustrative in section of the developing blade shown in FIG. 1; FIG. 2A is a sectional view as taken on arrowed line A-A and FIG. 2B is a sectional view as taken on arrowed line B-B. As depicted in FIGS. 1 and 2, a developing blade 1 comprises a support member 2 and a blade member 4 formed on one surface of the support member 2 along one side edge 2A, and the warping of the blade member in the longitudinal direction (the direction indicated by an arrow a in FIG. 1) is 10 mm or less.

The support member 2 forming a part of the developing blade 1 has a coefficient of elasticity in the range of $0.5\times10^4$ to $4.0\times10^4$ kg/mm$^2$, preferably $1.0\times10^4$ to $3.0\times10^4$ kg/mm$^2$, and a moment of inertia of area (Iz) in the range of 6.5E-04 to 1.2E-02, preferably 9.4E-04 to 5.2E-03. In other words, there is no limitation imposed on the material of the support member 2; use may be made of, for instance, a metal substrate such as one made up of stainless steel, e.g., SUS301 and SUS304, and phosphor bronze for springs, e.g., C5210, and beryllium copper, a ceramics substrate, a resin substrate such as one made up of PC (polycarbonate), and PBT (polybutylene terephthalate), and a carbon fiber substrate.

The thickness and width of the support member 2 may be determined as desired in consideration of what it is made of. For instance, when the material is stainless steel, the thickness may be selected from the range of 0.07 to 0.2 mm, preferably 0.09 to 0.15 mm and the width from the range of 12 to 30 mm, preferably 15 to 25 mm, and when the material is phosphor bronze, the thickness may be selected from the range of 0.2 to 0.4 mm, preferably 0.25 to 0.35 mm and the width from the range of 12 to 30 mm, preferably 15 to 25 mm.

The coefficient of elasticity of the support member here is measured according to the metal material tensile testing method JIS Z2241.

The moment of inertial of area (Iz) is figured out of the equation: $Iz=\int y^2 dA$, where y is the distance from the center of gravity to a minute area dA, and dA is the minute area. More specifically, the moment of inertia of area (Iz) is worked out as follows.

(i) When the sectional shape of the support member is, or is approximate to, a triangle, it is worked out from the following equation (1):

$$Iz=bh^3/36 \qquad \text{Eq. 1}$$

(b: the length (mm) of the base, and h: the height (mm))

(ii) When the sectional shape of the support member is, or is approximate to, a semicircle, it is worked out from the following equation (2):

$$Iz=0.1098r^4 \qquad \text{Eq. 2}$$

(r: the radius (mm) of the semicircle)

(iii) When the sectional area of the support member is, or is approximate to, a quarter circle, it is worked out from the following equation (3):

$$Iz=0.055r^4 \qquad \text{Eq. 3}$$

(r: the radius (mm) of the quarter circle)

(iv) When the sectional shape of the support member is, or is approximate to, a square, it is worked out from the following equation (4):

$$Iz=bh^3/12 \qquad \text{Eq. 4}$$

(b: the width (mm), and h: the height (mm))

However, when the sectional area of the support member lies somewhere between the aforesaid cases (i), (ii), (iii) and (iv) and it is difficult to determine which of equations 1 to 4 applies in this case, the values of Iz's from multiple equations that seem pertinent are figured out and their average is taken as the moment of inertia of area (Iz). Further, when the sectional area of the support member comprises a combination of two or more of the aforesaid cases (i) to (iv), Iz is figured out from any one of equations (1) to (4) for each shape and the sum is taken as the moment of inertia of area (Iz).

In the embodiment illustrated, the support member 2 also comprises a plurality of holes 3 along the side edge 2B opposite to the side edge 2A. Such holes 3 may optionally be used for mounting, alignment or the like; they are never limited to what is illustrated in the drawings.

The blade member 4 comprises a blade body 5 formed along the side edge 2A of the support member 2 and a skirt 6 positioned at one end of the blade body 5. The area of contact of the blade body 5 with a developing roller defines a curved surface that, in the embodiment illustrated, is of an almost semicircular shape in section.

In the developing blade 1 illustrated, the side edge 2A of the support member 2 extends out of the end portion 5A of the blade body 5 of the blade member 4. In such a case, the distance L (see FIGS. 1, 2A and 2B) between the end portion 5A of the blade body 5 and the side edge 2A of the support member 2 may be in the range of 0.02 to 2 mm, preferably 0.02 to 1 mm, and more preferably 0.3 to 1 mm. It is here noted that the developing blade of the invention is never limited to the embodiment illustrated; for instance, the side edge 2A of the support member 2 and the end portion 5A of the blade body 5 of the blade member 4 may define together the same end face, or the side edge 2A of the support member 2 may be of such structure as to be covered with the blade body 5.

The skirt 6 defines a site where a gate is to be positioned in the top mold to be described later. As shown in depicted in FIG. 3, the blade body 5 may comprise skirts 6*a* and 6*b* at both its ends. In this case, the skirt 6*a* defines a site where the gate is to be located in the top mold to be described later, and the skirt 6*b* works making smoother the flow of a molding material poured from the skirt 6*a* for the formation of the blade body 5. However, the gate may be located at either the skirt 6*a* or 6*b*.

Such blade member 4 has a 25% modulus of no greater than 0.85 MPa, and preferably in the range of 0.3 to 0.6 MPa, and a moment of inertia of area (Iz) in the range of 8E-02 to 1.2E+01, preferably 4.2E-01 to 6.0E+00. A 25% modulus exceeding 0.85 MPa is not preferable because there is likely to be a warp (deformation) of greater than 10 mm in the aforesaid support member 2. As the moment of inertia of area (Iz) is less than 8E-02, it may make the molding of the blade member 4 difficult or may do damage to the function of the developer equipment. A moment of inertia of area (Iz) exceeding 1.2E+01, on the other hand, is not preferable because it may be detrimental to size reductions of the developer equipment and result in added manufacturing cost.

The 25% modulus here is measured pursuant to the low deformation tensile testing method JIS K6254. In this case, measurement is carried out with a strip-form test piece of 5 mm in width, 100 mm in length and 2.0±0.2 mm in thickness and a gauge-to-gauge distance set at 40 mm at the middle of the test piece in the longitudinal direction while the test piece is elongated 25% (the gauge-to-gauge distance changes from 40 mm to 50 mm) at a tensile rate of 50±5 mm/min. Note here that the measuring gauge used is Strograph made by Toyo Seiki Co., Ltd. The moment of inertia of area (Iz) of the blade member is figured out as is the case with the moment of inertia of area of the aforesaid support member.

Figure 4:
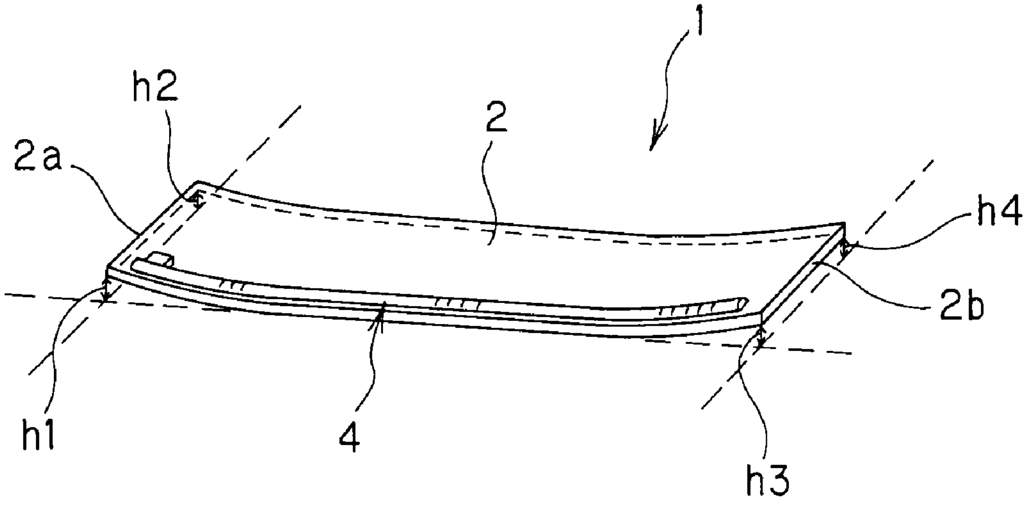
FIG. 4 is illustrative of how to measure the amount of warping.

To determine the degree of warping (deformation) of the developing blade, a developing blade comprising a support member of 18 mm in width W and 240 mm in length L (see FIG. 1) is placed on a horizontal plate with the blade member turned upside to obtain measurements for the maximum amount of warping (deformation) from the horizontal plate to the support member 2 at both ends 2*a* and 2*b* of the support member 2 in the longitudinal direction of the blade member 4 so that they are summed up to find the amount of warping (deformation) (mm). Referring typically to FIG. 4, when of the amounts of warping h1 and h2 at two corners of one end 2*a*, the maximum amount of warping is h1, and of the amounts of warping h3 and h4 at two corners of the other end 2*b*, the maximum amount of warping is h3, the amount of warping of the developing blade 1 becomes (h1+h3). As a matter of course, the measurement of the amount of warping is not limited to the corners of each end, and includes deformation of the developing blade due to its own weight.

The blade member 4 may be made of any desired material having a 25% modulus of no greater than 0.85 MPa, for instance, silicone rubber (Q), nitrile rubber (NBR), flurorubber (FKM), urethane rubber (U), epichlorohydrin rubber (CO), and hydrogenated nitrile rubber (HNBR).

Figure 5:
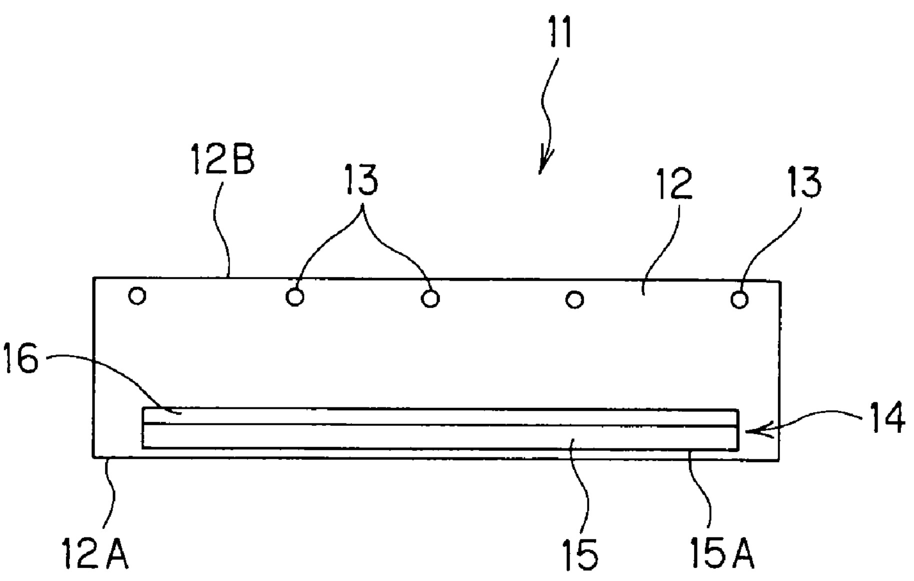
FIG. 5 is a plan view illustrative of yet another embodiment of the developing blade according to the invention.

FIG. 5 is a plan view of another embodiment of the developing blade according to the invention. In FIG. 5, a developing blade 11 comprises a support member 12 and a blade member 14 formed on one surface of the support member 12 along one side edge 12A. And the blade member 14 comprises a blade body 15 and a skirt 16 formed along the blade body 15. As is the case with the aforesaid skirt 6, that skirt 16 defines a site for locating a gate in the top mold to be described later, and works making smooth the flow of a molding material poured for the formation of the blade body 15. The gate may be located at either one or the other end of the skirt 16.

It is noted here that the support member 12 forming a part of the developing blade 11 comprises a plurality of holes 13 along the other side edge 12B.

In that developing blade 11, too, the side edge 12A of the support member 12 may extends out of the end portion 15A of the blade body 15 of the blade 14, in which case the distance between the end portion 15A of the blade body 15 and the side edge 12A of the support member 12 may be in the range of 0.02 to 2 mm, preferably 0.02 to 1 mm, and more preferably 0.3 to 1 mm.

Figure 6:
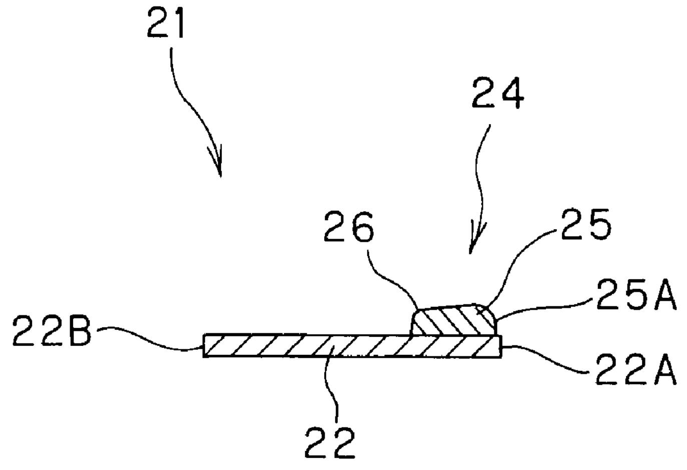
FIG. 6 is illustrative in section, as in FIG. 2A, of a further embodiment of the developing blade according to the invention.

FIG. 6 is illustrative in section, as in FIG. 2A, of yet another embodiment of the developing blade according to the invention. In FIG. 6, a developing blade 21 comprises a support member 22 and a blade member 24 formed on one surface of the support member 22 along one side edge 22A. In that developing blade 21, the blade member 24 comprises a blade body 25 and a skirt 26 continuously integral with the blade body 25. As is the case with the aforesaid skirt 6, such skirt 26 defines a site for locating a gate in the top mold to be described later, and works making smooth the flow of a molding material poured for the formation of the blade body 25. The gate may be located at either one or the other end of the skirt 26.

It is noted here that the support member 22 forming a part of the developing blade 21 comprises a plurality of holes along the other side edge 22B.

In that developing blade 21, too, the side edge 22A of the support member 22 may extend out of the end portion 25A of the blade body 25 of the blade 24, in which case the distance between the end portion 25A of the blade body 25 and the side edge 22A of the support member 22 may be in the range of 0.02 to 2 mm, preferably 0.02 to 1 mm, and more preferably 0.3 to 1 mm.

The support member 12, 22 and blade member 14, 24 forming the aforesaid developing blade 11, 21 are similar to the support member 2 and blade member 4 forming the aforesaid developing blade 1. Accordingly, the support member 12, 22 has a coefficient of elasticity in the range of $0.5\times10^4$ to $4.0\times10^4$ kg/mm$^2$, preferably $1.0\times10^4$ to $3.0\times10^4$ kg/mm$^2$, and a moment of inertia of area (Iz) in the range of 6.5E-04 to 1.2E-02, preferably 9.4E-04 to 5.2E-03. The blade member 14, 24 is made of a rubber material having a 25% modulus of no greater than 0.85 MPa, preferably 0.3 to 0.6 MPa, and has a moment of inertia of area (Iz) in the range of 8E-02 to 1.2E+01, preferably 4.2E-01 to 6.0E+00.

The developing blade of the invention may be manufactured by either injection molding or transfer molding.

Taking the aforesaid developing blade 1 as an example, the developing blade manufacturing method of the invention is now explained.

Figure 7:
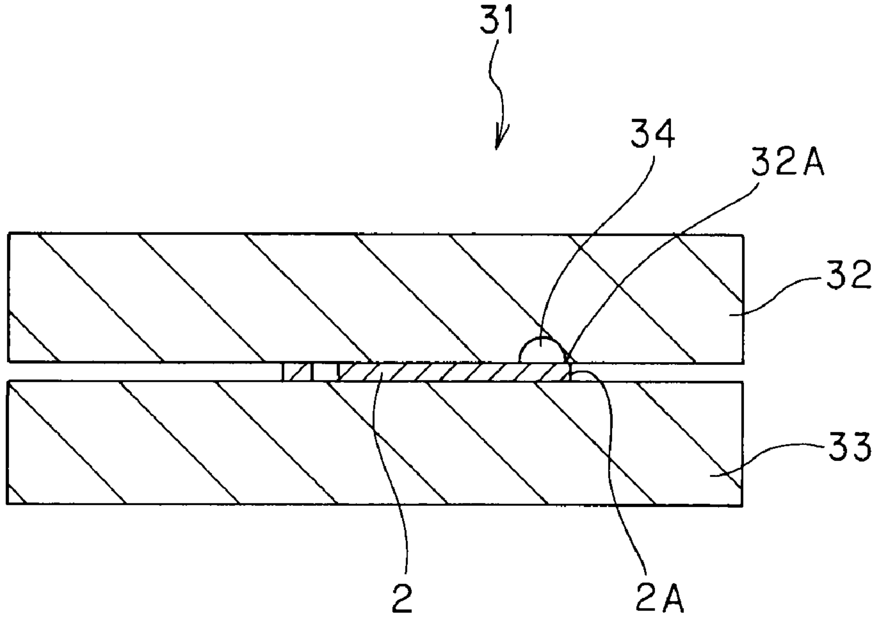
FIG. 7 is illustrative of one mold assembly used with the developing blade manufacturing method according to the invention.
Figure 8:
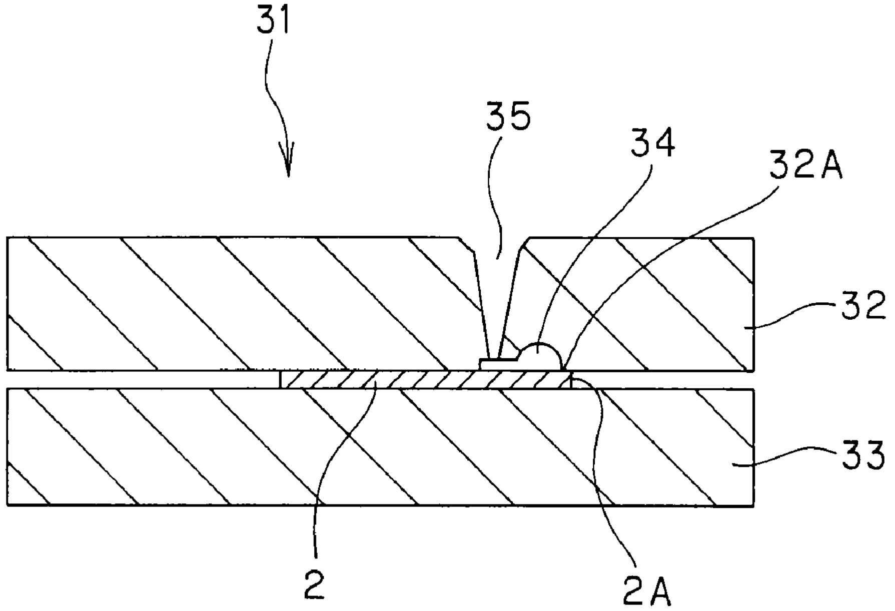
FIG. 8 is illustrative of one mold assembly used with the developing blade manufacturing method according to the invention.

FIGS. 7 and 8 are illustrative of one example of the mold assembly used for manufacturing the developing blade of the invention by means of injection molding; FIG. 7 is a sectional view of the aforesaid developing blade at a site shown in FIG.

2A, and FIG. 8 is a sectional view of the aforesaid developing blade at a site shown in FIG. 2B.

Referring to FIGS. 7 and 8, a mold assembly 31 used herein is built up of a top mold 32 and a bottom mold 33 having a flat mold surface. The top mold 32 comprises a mold surface with a cavity 34 formed in it for the formation of a blade member, and a gate 35 in communication with the cavity 34. The gate 35 is located at a site corresponding to the skirt 6 of the aforesaid developing blade 1. And the support member 2 is inserted such that the cavity 34 is closed up with a support member 2, and the neighborhood of the side edge 2A of the support member 2 is held between the edge 32A of the cavity 34 in the top mold and the bottom mold 33. In this state, the top mold 32 and bottom mold 33 are brought in alignment with each other and clamped together. Thereafter, a molding material is poured from the gate 35 and filled up in the cavity 34 to manufacture the developing blade 1.

Figure 9A:
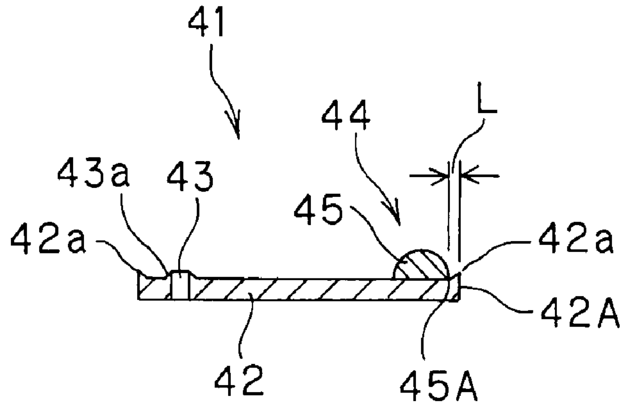
FIGS. 9A and 9B are sectional views at sites corresponding to FIGS. 2A and 2B, respectively.
Figure 9B:
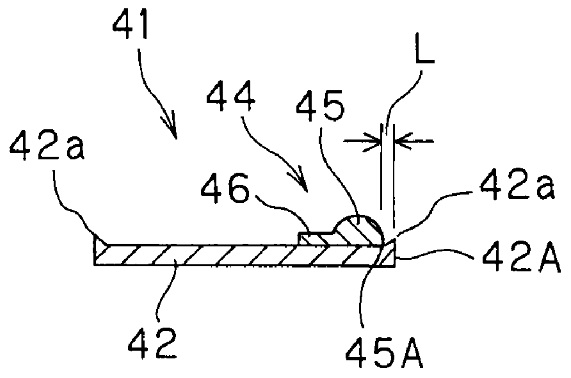

FIG. 9 is illustrative of a further embodiment of the developing blade according to the invention; FIG. 9A is a sectional view of the developing blade at a site corresponding to FIG. 2A, and FIG. 9B is a sectional view of the developing blade at a site corresponding to FIG. 2B. As depicted in FIG. 9, a developing blade 41 comprises a support member 42 and a blade member 44 formed along one side edge 42A of the support member 42.

The support member 42 forming a part of the developing blade 41 comprises a plurality of holes 43 along the side edge 42B opposite to the side edge 42A. The support member 42 also comprises a minute projection 42*a* jutting toward the surface with the blade member 44 formed on it, and there are minute projections 43*a* lying around the holes 43. It is here noted that each hole 43 is provided for mounting, alignment or the like as desired: it is never limited to the embodiment illustrated.

The blade member 44 is similar to the blade member 4 forming a part of the aforesaid developing blade 1, and comprises a blade body 45 formed along the side edge 42A of the support member 42 and a skirt 46 positioned at each end of the blade body 45. In the embodiment illustrated, the side edge 42A of the support member 42 extends out of the end portion 45A of the blade body 45 of the blade 44, in which case the distance L (see FIG. 9) between the end portion 45A of the blade body 45 and the side edge 42A of the support member 42 may be in the range of 0.02 to 2 mm, preferably 0.02 to 1 mm, and more preferably 0.3 to 1 mm.

The support member 42 and blade member 44 forming the aforesaid developing blade 41 are similar to the support member 2 and blade member 4 forming the aforesaid developing blade 1. Accordingly, the support member 42 has a coefficient of elasticity in the range of $0.5\times10^4$ to $4.0\times10^4$ kg/mm$^2$, preferably $1.0\times10^4$ to $3.0\times10^4$ kg/mm$^2$, and a moment of inertia of area (Iz) in the range of 6.5E-04 to 1.2E-02, preferably 9.4E-04 to 5.2E-03. The blade member 44 is made of a rubber material having a 25% modulus of no greater than 0.85 MPa, preferably 0.3 to 0.6 MPa, and has a moment of inertia of area (Iz) in the range of 8E-02 to 1.2E+01, preferably 4.2E-01 to 6.0E+00.

Taking the aforesaid developing blade 41 as an example, the developing blade manufacturing method of the invention is now explained.

Figure 10:
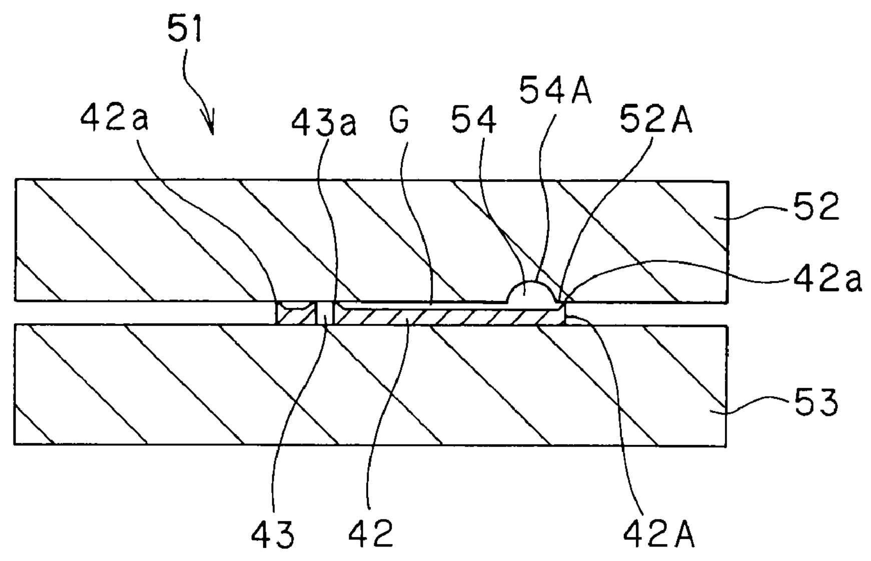
FIG. 10 is illustrative of another mold assembly used with the developing blade manufacturing method according to the invention.
Figure 11:
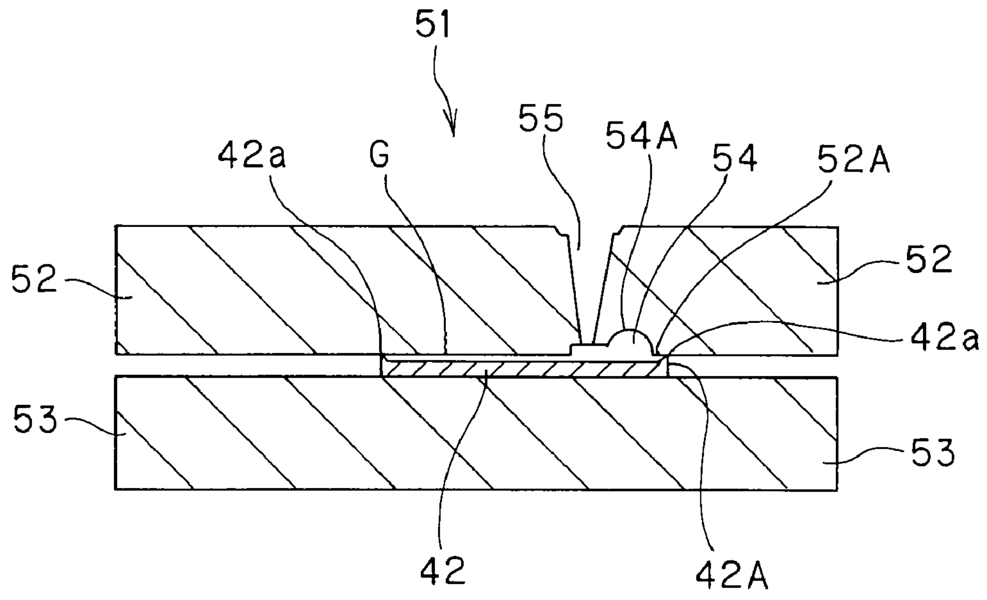
FIG. 11 is illustrative of another mold assembly used with the developing blade manufacturing method according to the invention.
Figure 12:
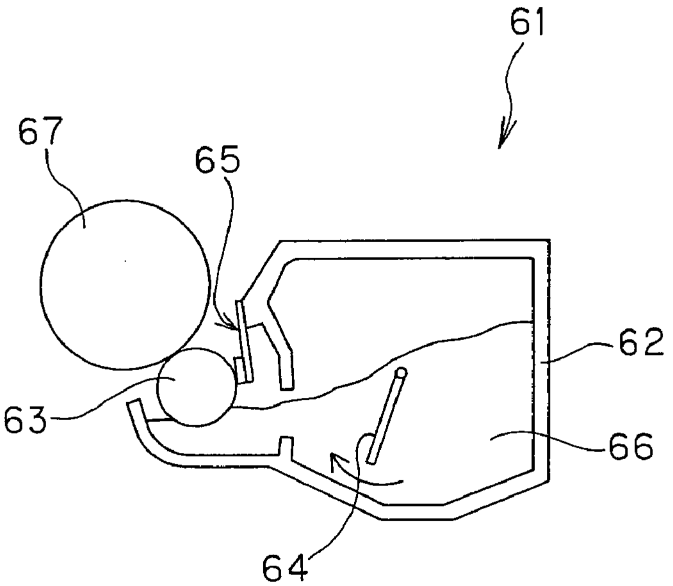
FIG.12 Background Art
FIG. 12 is illustrative of one example of the structure of the developer equipment.
Figure 13:
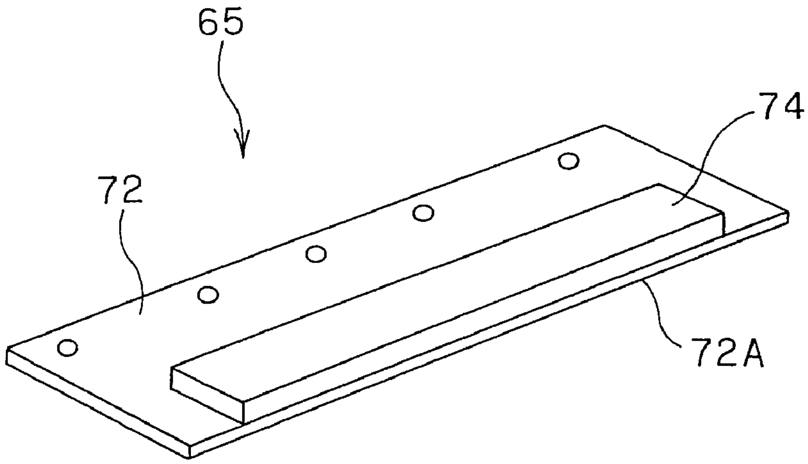
FIG.13 Background Art
FIG. 13 is illustrative in perspective of one example of the prior art developing blade.

FIGS. 10 and 11 are illustrative of the mold assembly used for manufacturing the developing blade, of the invention; FIG. 10 is a sectional view of the aforesaid developing blade 41 at a site shown in FIG. 9A, and FIG. 11 is a sectional view of the aforesaid developing blade 41 at a site shown in FIG. 9B.

In FIGS. 10 and 11, the mold assembly 51 used, similar to the aforesaid mold assembly 11, comprises a top mold 52 comprising a mold surface with a cavity 54 formed in it for the formation of the blade member 44 and a gate 55 in communication with the cavity 54 and a bottom mold 53 having a flat mold surface. The gate 55 is located at a site corresponding to the skirt 46 of the aforesaid developing blade 41. And the support member 42 is inserted such that the support member 42 having the minute projection 42*a* on the end side of one surface and minute projections 43*a* around the holes 43 is placed with the surface having the minute projections 42*a* and 43*a* in opposition to the mold surface of the top mold 52, the cavity 45 is closed up with the support member 42, and the neighborhood of the side edge 42A of the support member 42 is held between the edge portion 52A of the cavity 54 in the top mold 52 and the bottom mold 53. In this state, the top mold 52 and bottom mold 53 are in alignment and clamped together. Thereafter, a molding material is poured from the gate 55 to fill up the cavity 54 to manufacture the development blade 41.

The support member 42 having the minute projections 42*a* and 43*a* on one surface may be prepared by punching out a sheet material having a coefficient of elasticity in the range of $0.5\times10^4$ to $4.0\times10^4$ kg/mm$^2$, preferably $1.0\times10^4$ to $3.0\times10^4$ kg/mm$^2$, and a moment of inertia of area (Iz) in the range of 6.5E-04 to 1.2E-02, preferably 9.4E-04 to 5.2E-03. The minute projections 42*a* and 43*a* jutting from the surface of the support member 42 may have its height and width set in the range of, for instance, 0.02 to 0.05 mm, and 0.02 to 0.1 mm, respectively.

The width of the support member 42 held between the edge 52A of the cavity 54 in the top mold 52 and the bottom mold 53 is in the range of 0.02 to 0.2 mm, preferably 0.02 to 1 mm, and more preferably 0.3 to 1 mm as viewed from the side edge 42A. As the width of the held support member 42 is less than 0.02 mm, the engagement of the support member 42 including the minute projection 42*a* with the top mold 52 becomes insufficient, resulting possibly in the occurrence of fins. On the other hand, exceeding 2 mm is not preferable because there is an increase in the size upon mounting of the developing blade.

In the invention, the top and bottom molds are clamped together while the neighborhood of the side edge 42A of the support member 42 is held between the edge 52A of the cavity in the top mold and the bottom mold 53. Consequently, the minute projections 42*a* and 43*a* are deformed by the clamping pressure into firm engagement with the top mold 52 and, at the same time, the minute projection 42*a* works as a barrier, making surer prevention of fins from occurring in a direction toward the side edge 42A of the support member 42. Accordingly, the resultant developing blade 41 is free from fins at its end (the side edge 42A of the support member 42).

It is here understood that when the minute projections 42*a* and 43*a* are deformed by the clamping pressure, there is going to be a fine gap G occurring between the support member 42 and the top mold 52, and entrance of the molding material in that gap G may give rise to fins. However, such fins have no adverse influence on the function of the developing blade 41 at all, because they cannot possibly be located at the end of the developing blade 41 (the side edge 42A of the support member 42).

The aforesaid embodiments have been described by way of example alone but not by way of limitation.

The invention is now explained in further details with reference to more specific examples.

Example 1

A SUS301 sheet material of 0.1 mm in thickness, 18 mm in width and 240 mm in length was readied up for the support member. This support member had a coefficient of elasticity of $1.9\times10^4$ kg/mm$^2$ and a moment of inertial of area (Iz) of 1.5E-0.3. Note here that the coefficient of elasticity of the support member was measured pursuant to the metal material tensile testing method JIS Z2241, and that the moment of inertia of area (Iz) was figured out from the sectional morphology of the support member: the aforesaid equation (4) $Iz=bh^3/12$ for the rectangular support member, yielding $Iz=18\times0.1^3/12=1.5E\text{-}03$.

Then, six mixtures of liquid silicone rubber and curing agents (mixtures A to F) were readied up. Then, the six mixtures as well as such an injection molding assembly as shown in FIGS. 7 and 8 and the aforesaid support member were used to prepare six developing blades (samples 1 to 6). The 25% modulus of the blade member forming a part of each developing blade was measured by the following method, with the results being set out in Table 1. The moment of inertia of area (Iz) of the blade member forming a part of each developing blade was 7E-01.

(Measurement of the 25% Modulus)

Measurement was carried out pursuant to the low elongation tensile testing method JIS K6254. In this case, the six liquid silicone rubber/curing agent mixtures A to F were cured into strip-form test pieces of 5 mm in width, 100 mm in length and 2.0±2 mm in thickness. A gauge-to-gauge distance was set 40 mm at the middle of each test piece in the longitudinal direction, and it was elongated 25% at a tensile rate of 50±5 mm/minute (the gauge-to-gauge distance changed from 40 mm to 50 mm). The measuring gauge used was Strograph (made by Toyo Seiki Co., Ltd.).

The thus prepared developing blades (samples 1 to 6) were each measured for the amount of warping by the following method, with the results being set out in Table 1.

(Measurement of the Amount of Warping)

The developing blade was placed on a horizontal plate with the blade member turned upside, and the maximum amount of warping from the horizontal plate to the support member is measured at both ends of the blade member in the longitudinal direction. To find the amount of warping (deformation), these measurements (mm) are summed up.

TABLE 1

| Developing Blade | Support Member: Coefficient of Elasticity (kg/mm$^2$) | Support Member: Moment of Inertia of Area |
|---|---|---|
| Sample 1 | $1.9\times10^4$ | 1.5E−03 |
| Sample 2 | $1.9\times10^4$ | 1.5E−03 |
| Sample 3 | $1.9\times10^4$ | 1.5E−03 |
| Sample 4 | $1.9\times10^4$ | 1.5E−03 |
| Sample 5 | $1.9\times10^4$ | 1.5E−03 |
| Sample 6 | $1.9\times10^4$ | 1.5E−03 |

| Developing Blade | Blade Member: Material | Blade Member: 25% Modulus (MPa) | Blade Member: Moment of inertia of Area |
|---|---|---|---|
| Sample 1 | Mixture A | 0.40 | 7E−01 |
| Sample 2 | Mixture B | 0.60 | 7E−01 |
| Sample 3 | Mixture C | 0.80 | 7E−01 |
| Sample 4 | Mixture D | 0.85 | 7E−01 |
| Sample 5 | Mixture E | 1.0 | 7E−01 |
| Sample 6 | Mixture F | 1.1 | 7E−01 |

| Developing Blade | Amount of Warping (mm) |
|---|---|
| Sample 1 | 0.5 |
| Sample 2 | 2.0 |
| Sample 3 | 4.0 |
| Sample 4 | 9.5 |
| Sample 5 | 12 |
| Sample 6 | 15 |

As set out in Table 1, the developing blades (samples 1 to 4) all had an amount of warping of no greater than 10 mm, each comprising a SUS301 sheet material support member that had a coefficient of elasticity of $1.9\times10^4$ kg/mm$^2$ and a moment of inertial of area (Iz) of 1.5E-03 and was very thin as expressed by a thickness (0.1 mm)-to-length (240 mm) ratio of 2,400 and a blade member that had a linear expansion coefficient one-digit different from that of the support member, a moment of inertia of area (Iz) of 7E-01 and a 25% modulus of no greater than 0.85 MPa.

Example 2

The same SUS301 sheet material as in Example 1 was readied up for the support member.

Then, NBR, and FKM (LT303 made by Daikin Kogyo Co., Ltd.) and silicone rubber (X34-1595-B made by The Shin-Etsu Chemical Co., Ltd.) were readied up for the rubber material. Developing blades (samples 7 and 8) were prepared by molding blade members on one surface of the aforesaid support member by use of transfer molding. As a result of measuring the 25% modulus of the blade member forming a part of each developing blade as in Example 1, that of the developing blade (sample 7) for which NBR was used was 0.7 MPa, and that of the developing blade (sample 8) for which FKM and silicone rubber were used was 0.5 MPa. The moment of inertia of area (Iz) of the blade member was 7E-01 in both samples 7 and 8.

As a result of measuring the amount of warping of each of the thus prepared developing blades as in Example 1, that of the developing blade (sample 7) for which NBR was used was 4 mm, and that of the developing blade (sample 8) for which FKM was used was 2 mm. From this, it is found that as long as the blade member has a moment of inertia of area (Iz) of 7E-01 and a 25% modulus of no greater than 0.85 MPa, an amount of warping of no greater than 10 mm is achievable even when NBR or FKM is used as the rubber material and the SUS301 sheet material support member used has a coefficient of elasticity of $1.9\times10^4$ kg/mm$^2$ and a moment of inertia of area (Iz) of 1.5E-03 and is very thin.

Example 3

The same SUS301 sheet material as in Example 1 was readied up for the support member.

Then, the same liquid silicone rubber/curing agent mixture B as used in Example 1 was readied up. Then, five developing blades (samples 9 to 13) comprising blade members having different moments of inertia of area were prepared by means of injection molding as in Example 1 with the exception of using an injection molding assembly having a top mold having a different cavity capacity. The moment of inertia of area of each of the blade members forming five such developing blades (samples 9 to 13) is set out in Table 2. The 25% modulus of the blade member forming a part of each developing blade was 0.6 MPa.

The five developing blades (samples 9 to 13) prepared as described above were each measured for the amount of warping as in Example 1. The results are set out in Table 2.

TABLE 2

| Developing Blade | Support Member: Coefficient of Elasticity ($kg/mm^2$) | Support Member: Moment of Inertia of Area |
|---|---|---|
| Sample 9 | $1.9 \times 10^4$ | 1.5E−03 |
| Sample 10 | $1.9 \times 10^4$ | 1.5E−03 |
| Sample 11 | $1.9 \times 10^4$ | 1.5E−03 |
| Sample 12 | $1.9 \times 10^4$ | 1.5E−03 |
| Sample 13 | $1.9 \times 10^4$ | 1.5E−03 |

| Developing Blade | Blade Member: Material | Blade Member: 25% Modulus (MPa) | Blade Member: Moment of inertia of Area |
|---|---|---|---|
| Sample 9 | Mixture B | 0.60 | 8E−01 |
| Sample 10 | Mixture B | 0.60 | 1E 0 |
| Sample 11 | Mixture B | 0.60 | 4E 0 |
| Sample 12 | Mixture B | 0.60 | 1.2E+01 |
| Sample 13 | Mixture B | 0.60 | 2E+01 |

| Developing Blade | Amount of Warping (mm) |
|---|---|
| Sample 9 | 0 |
| Sample 10 | 1.5 |
| Sample 11 | 4.0 |
| Sample 12 | 10 |
| Sample 13 | 20 |

As set out in Table 2, samples 9 to 12 all had an amount of warping of no greater than 10 mm, each comprising a SUS301 sheet material support member that had a coefficient of elasticity of $1.9 \times 10^4$ $kg/mm^2$ and a moment of inertial of area (Iz) of 1.5E-03 and was very thin as expressed by a thickness (0.1 mm)-to-length (240 mm) ratio of 2,400 and a blade member that had a linear expansion coefficient one-digit different from that of the support member, a moment of inertia of area (Iz) in the range of 8E-02 to 1.2E+01 and a 25% modulus of no greater than 0.85 MPa (0.60 MPa).

In contrast, the developing blade (sample 13) comprising a blade member having a moment of inertia of area (Iz) of greater than 1.2E+01 has an amount of warping of greater than 10 mm: it could not practically be used.

Example 4

Five SUS301 sheet materials (support members A to E) having a width of 18 mm and a length of 240 mm and different coefficients of elasticity were readied up for the support members. The coefficients of elasticity of such support members A to E were measured as in Example 1, with the results being set out in Table 3. Note here that the moment of inertia of area (Iz) of each of the support members A to E was 1.5E-03.

Then, the same liquid silicone rubber/curing agent mixture B as used in Example 1 was readied up, and five developing blades (samples 14 to 18) were prepared by means of injection molding as in Example 1. The blade member forming a part of each developing blade had a 25% modulus of 0.6 MPa and a moment of inertia of area of 7E-01.

The five developing blades (samples 14 to 18) prepared as described above were each measured for the amount of warping as in Example 1. The results are set out in Table 3.

TABLE 3

| Developing Blade | Support Member: Coefficient of Elasticity ($kg/mm^2$) | Support Member: Moment of Inertia of Area |
|---|---|---|
| Sample 14 | $0.3 \times 10^4$ (Support member A) | 1.5E−03 |
| Sample 15 | $0.5 \times 10^4$ (Support Member B) | 1.5E−03 |
| Sample 16 | $1.9 \times 10^4$ (Support member C) | 1.5E−03 |
| Sample 17 | $4.0 \times 10^4$ (Support Member D) | 1.5E−03 |
| Sample 18 | $5.0 \times 10^4$ (Support Member E) | 1.5E−03 |

| Developing Blade | Blade Member: Material | Blade Member: 25% Modulus (MPa) | Blade Member: Moment of Inertia of Area |
|---|---|---|---|
| Sample 14 | Mixture B | 0.60 | 7E−01 |
| Sample 15 | Mixture B | 0.60 | 7E−01 |
| Sample 16 | Mixture B | 0.60 | 7E−01 |
| Sample 17 | Mixture B | 0.60 | 7E−01 |
| Sample 18 | Mixture B | 0.60 | 7E−01 |

| Developing Blade | Amount of Warping (mm) |
|---|---|
| Sample 14 | 15 |
| Sample 15 | 10 |
| Sample 16 | 2 |
| Sample 17 | 0.2 |
| Sample 18 | 0.1 |

As set out in Table 3, the developing blades (samples 15, 16, 17) all had an amount of warping of no greater than 10 mm, each comprising support member B, C, D having a coefficient of elasticity in the range of $0.5 \times 10^4$ to $4.0 \times 10^4$ $kg/mm^2$ and a moment of inertia of area (Iz) of 1.5E-03 and a blade member having a moment of inertia of area in the range of 8E-02 to 1.2E+01 and a 25% modulus of no greater than 0.85 MPa (0.60 MPa).

In contrast, the developing blade (sample 14) for which the support member A having a small coefficient of elasticity was used had an amount of warping of 15 mm. On the other hand, the developing blade (sample 18) for which the support member E having a large coefficient of elasticity was used had an amount of warping of as small as 0.1 mm; however, the support member, because of having a large coefficient of elasticity, was likely to work against the appearance of the function of the developing blade and give rise to an increase in the manufacturing cost.

Example 5

Five SUS301 sheet materials (support members F to J) having a width of 18 mm and a length of 240 mm and different thicknesses were readied up for the support members. The moment of inertia of area of each support member F, G, H, I, J was figured out as in Example 1, with the results being set out in Table 4. Note here that the coefficient of elasticity of each support member F, G, H, I, J was $1.9 \times 10^4$ $kg/mm^2$.

Then, the same liquid silicone rubber/curing agent mixture B as used in Example 1 was readied up, and five developing blades (samples 19 to 23) were prepared by means of injection molding as in Example 1. The blade member forming a part of each developing blade had a 25% modulus of 0.6 MPa and a moment of inertia of area of 7E-01.

The five developing blades (samples 19 to 23) prepared as described above were each measured for the amount of warping as in Example 1. The results are set out in Table 4.

TABLE 4

| Developing Blade | Support Member: Coefficient of Elasticity ($kg/mm^2$) | Support Member: Moment of Inertia of Area |
|---|---|---|
| Sample 19 | $1.9 \times 10^4$ | 4.1E−02 (Support member F) |
| Sample 20 | $1.9 \times 10^4$ | 1.2E−02 (Support member G) |
| Sample 21 | $1.9 \times 10^4$ | 1.5E−03 (Support member H) |
| Sample 22 | $1.9 \times 10^4$ | 6.5E−04 (Support member I) |
| Sample 23 | $1.9 \times 10^4$ | 5.2E−04 (Support member J) |

| Developing Blade | Blade Member: Material | 25% Modulus (MPa) | Moment of Inertia of of Area |
|---|---|---|---|
| Sample 19 | Mixture B | 0.60 | 7E−01 |
| Sample 20 | Mixture B | 0.60 | 7E−01 |
| Sample 21 | Mixture B | 0.60 | 7E−01 |
| Sample 22 | Mixture B | 0.60 | 7E−01 |
| Sample 23 | Mixture B | 0.60 | 7E−01 |

| Developing Blade | Amount of Warping (mm) |
|---|---|
| Sample 19 | 0 |
| Sample 20 | 0.5 |
| Sample 21 | 4.0 |
| Sample 22 | 9.0 |
| Sample 23 | 11 |

As set out in Table 4, the developing blades (samples 20, 21, 22) all had an amount of warping of no greater than 10 mm, each comprising support member G, H, I having a moment of inertia of area in the range of 6.5E-04 to 1.2E-02 and a coefficient of elasticity of $1.9\times10^4$ $kg/mm^2$ and a blade member having a moment of inertia of area in the range of 8E-02 to 1.2E+01 (7E-01) and a 25% modulus of no greater than 0.85 MPa (0.60 MPa).

In contrast, although the developing blade (sample 19) using the support member F having a moment of inertia of area exceeding 1.2E-02 had an amount of warping of 0 mm, yet the support member was detrimental to the appearance of the function of the developing blade because of its decreased spring action. On the other hand, the developing blade (sample 23) using the support member J having a moment of inertia of area of less than 6.5E-04 had an amount of warping exceeding 10 mm, so it could not practically be used.

INDUSTRIAL APPLICABILITY

The present invention is applicable to developing blades used on developers in electrophotographic imagers.

What we claim is:

1. A developing blade, comprising:

a support member; and a blade member located on one surface of said support member along one side edge of said support member, wherein, said support member has a coefficient of elasticity in a range of $0.5\times10^4$ to $4.0\times10^4$ $kg/mm^2$ and a moment of inertia of area (Iz) in a range of 6.5E-04 to 1.2E-02, said blade member is made of a rubber material having a 25% modulus of no greater than 0.85 MPa and has a moment of inertia of area (Iz) in a range of 8E-02 to 1.2E+01, and said blade member has a warping of no greater than 10 mm in a longitudinal direction.

2. The developing blade according to claim 1, wherein said support member is made of stainless steel and has a thickness of 0.07 to 0.2 mm and a width of 12 to 30 mm.

3. The developing blade according to claim 1, wherein said support member is made of phosphor bronze and has a thickness of 0.2 to 0.4 mm and a width of 12 to 30 mm.

4. The developing blade according to claim 1, wherein, said blade member comprises a blade body and a skirt positioned at least at one end of a side edge of said blade body facing away from said side edge of said support member, and an area of contact of said blade member with a developing roller defines a curved surface.

5. The developing blade according to claim 1, wherein, said blade member comprises a blade body and a skirt formed along the side edge of said blade body facing away from said side edge of said support member, and an area of contact of said blade member with a developing roller defines a curved surface.

6. The developing blade according to claim 1, wherein said side edge of said support member extends 0.02 to 2 mm out of a top end of said blade member.

7. The developing blade according to claim 6, wherein said support member has at a peripheral edge a minute projection jutting toward a surface having said blade member.

8. A method for manufacturing a developing blade comprising a blade member along one side edge of a support member, comprising:

using as the support member a material having a coefficient of elasticity in a range of $0.5\times10^4$ to $4.0\times10^4$ $kg/mm^2$ and a moment of inertia of area (Iz) in a range of 6.5E-04 to 1.2E-02;

using as the blade member a rubber material having a 25% modulus of no greater than 0.85 MPa and having a moment of inertia of area (Iz) in a range of 8E-02 to 1.2E+01; and using a mold comprising:

a top mold surface with a cavity formed for the formation of the blade member and a gate in communication with said cavity; and a bottom mold having a flat mold surface, wherein while said cavity is closed up with said support member and a neighborhood of said side edge of said support member is held between an edge of said cavity in the top mold and the bottom mold, the top and bottom molds are brought in alignment and clamped together, so that a molding material is poured from said gate into said cavity.

9. The developing blade manufacturing method according to claim 8, wherein a portion 0.02 to 2 mm away from said side edge of said support member is held between the edge of said cavity in the top mold and the bottom mold.

10. The developing blade manufacturing method according to claim 8, wherein, said support member has a minute projection at a side edge of one surface, and said support member is held while the surface having said minute projection faces the mold surface of said top mold.

* * * * *